United States Patent
Downes, Jr.

[11] Patent Number: 6,003,997
[45] Date of Patent: Dec. 21, 1999

[54] CONSTANT PATH-LENGTH BEAM TRANSLATING SYSTEM AND METHOD

[75] Inventor: George Richard Downes, Jr., Orlando, Fla.

[73] Assignee: Autonomous Technologies Corporation, Orlando, Fla.

[21] Appl. No.: 08/818,175

[22] Filed: Mar. 14, 1997

[51] Int. Cl.⁶ .................................................. G02B 5/08
[52] U.S. Cl. ...................... 359/857; 359/856; 359/855; 359/861; 359/876
[58] Field of Search .................................. 359/857, 856, 359/855, 861, 876

[56] References Cited

U.S. PATENT DOCUMENTS 5,015,096  5/1991  Kowalski et al. ........................ 359/857

*Primary Examiner*—Thong Nguyen
*Assistant Examiner*—Mohammad Y. Sikder
*Attorney, Agent, or Firm*—Allen, Dyer, Doppelt, Milbrath & Gilchrist, P.A.

[57] ABSTRACT

A method and system are provided for the constant path-length translation of a laser beam. At least one pair of mirrors disposed at an angle (e.g., 90°) to one another and fixed in relation to one another are disposed in the path of the (incoming) laser beam. The mirrors are positioned such that the incoming laser beam impinges on the first mirror, is reflected to the second mirror, and iii) is reflected from the second mirror as an (outgoing) laser beam parallel to the incoming laser beam. A positioner is coupled to the mirrors for simultaneously moving them in a direction that is parallel to the target plane and in a plane defined by the incoming and outgoing laser beams.

14 Claims, 3 Drawing Sheets

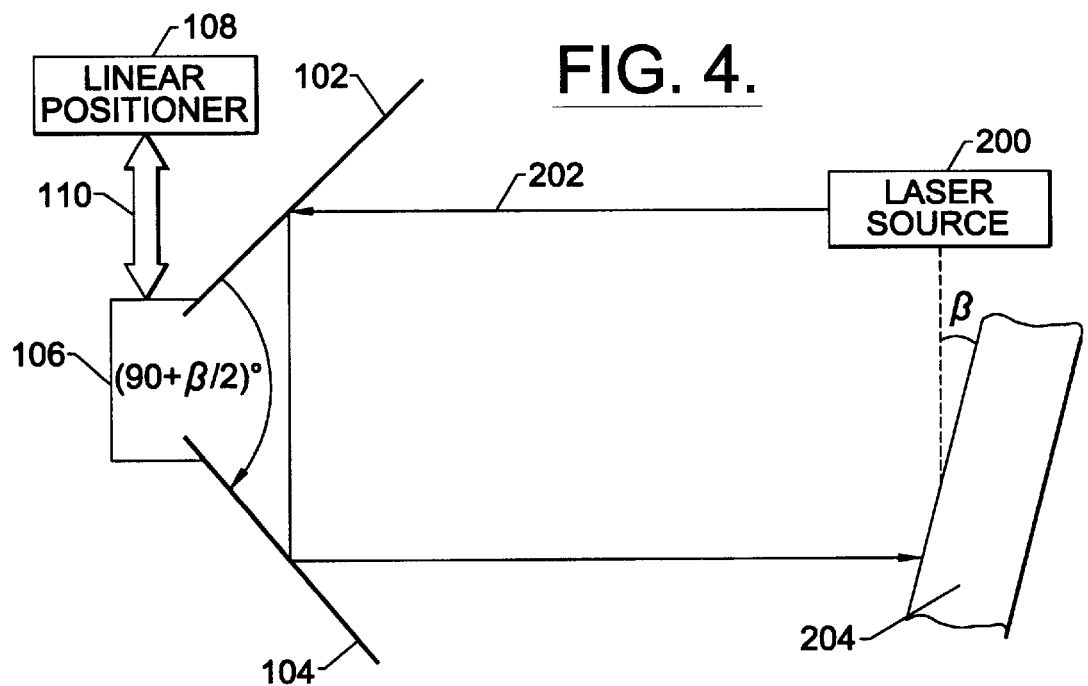
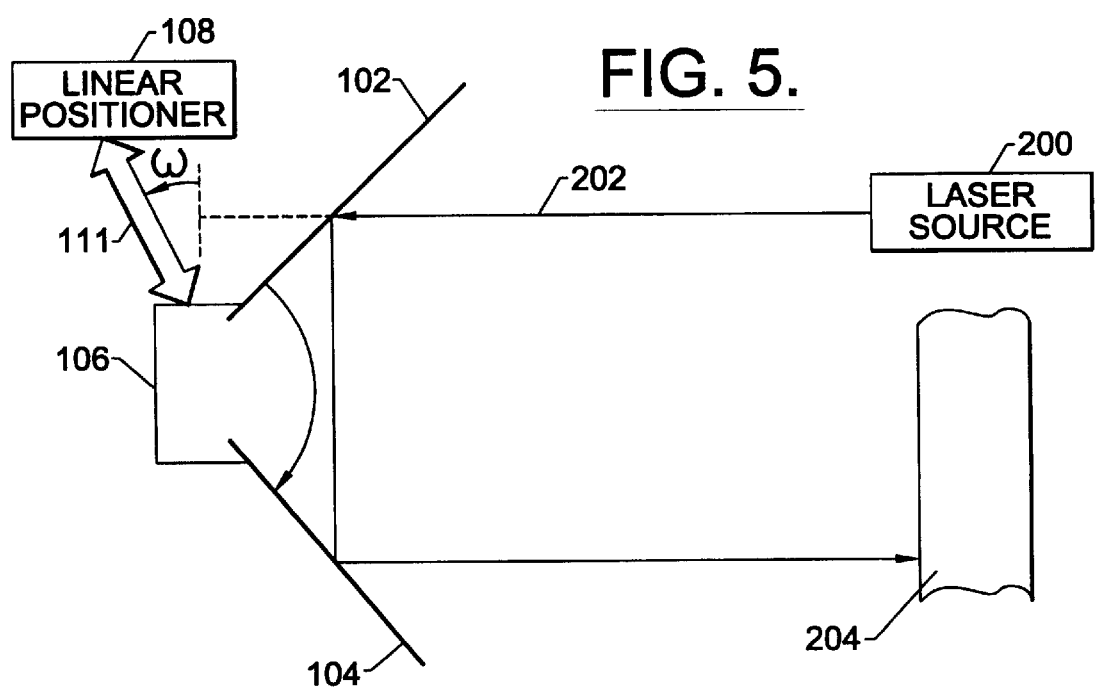

6,003,997

CONSTANT PATH-LENGTH BEAM TRANSLATING SYSTEM AND METHOD

FIELD OF THE INVENTION

The invention relates generally to directing beams of radiation, and more particularly to a method and system for translating a beam of radiation in one or more dimensions while maintaining a constant path-length before, during and after such translation.

BACKGROUND OF THE INVENTION

Lateral movement of a laser beam is typically accomplished in one of two fashions. In one approach, a laser beam is steered by a mirror capable of angular movement. For example, in FIG. 1, a laser source 10 is fixed in its position to direct laser beam 12 towards a galvo-mirror driver 14. As is known in the art, driver 14 is a motor-like device with a mirror affixed to its shaft. The shaft can make small angular movements to either side of a given center position. Thus, driver 14 operates to change the angular position of laser beam 12 relative to a workpiece 16. However, the angular movement of driver 14 must be controlled very precisely in order to achieve specific lateral displacement (e.g., in the x and/or y directions) on the surface of workpiece 16. In addition, each time the angle of laser beam 12 relative to workpiece 16 changes, so does the path length of the beam. This can present problems in laser machining operations (e.g., custom corneal ablation) where the laser beam may have been optimized for a particular path length. Thus, a change in path length means that the laser beam is no longer optimized when it strikes the workpiece. This can result in either too little or too much "machining" at the surface of the workpiece.

The second approach, shown schematically in FIG. 2, involves the use of a mirror 20 and a linear positioner 22 coupled to the mirror. A laser source 24 is fixed in its position and mirror 20 is placed in the path of the generated laser beam 26 at angle θ (e.g., 45°) therewith. Linear positioner 22 is used to move mirror 20 linearly towards or away from laser source 24 as represented by two-headed arrow 28. Such movement of mirror 20 causes a 1:1 corresponding amount of lateral displacement of beam 26 at the surface of workpiece 30. While precise amounts of movement can be achieved with linear positioners, the path length of beam 26 from laser source 24 to workpiece 30 changes each time mirror 20 is moved. In addition, since beam displacement is in 1:1 correspondence with mirror displacement, response time in terms of beam displacement is dictated by the speed of the linear positioner.

SUMMARY OF THE INVENTION

Accordingly, it is an object of the present invention to provide a method and system for translating a beam of radiation at the surface of a workpiece without changing the path length thereof.

Another object of the present invention is to provide a method and system for quickly and precisely translating a laser beam in one or two dimensions.

Other objects and advantages of the present invention will become more obvious hereinafter in the specification and drawings.

In accordance with the present invention, a method and system are provided for the constant path-length translation of a beam of radiation, e.g., a laser beam. At least one pair of mirrors having reflective surfaces disposed at an angle to one another and fixed in relation to one another are disposed in a path of an incoming beam of radiation. The pair of mirrors are positioned such that the incoming beam i) impinges on the reflective surface of a first of the pair of mirrors, ii) is reflected to the reflective surface of a second of the pair of mirrors, and iii) is reflected from the second of the pair of mirrors as an outgoing beam parallel to the incoming beam. A positioner is coupled to the pair of mirrors for simultaneously moving them in a direction that is angularly disposed to the incoming beam and lying in a plane defined by the incoming beam and the outgoing beam. Displacement of the pair of mirrors causes a displacement of the outgoing beam in the same direction. The path length defined by the incoming beam and the outgoing beam in a plane perpendicular to the outgoing beam stays the same prior to, during and after the pair of mirrors are moved when, for example, the angle between the mirrors is 90° and the direction of mirror movement is parallel to the plane perpendicular to the outgoing beam.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein:

FIG. 4 is a schematic view of an alternative beam translating system where the surface of the workpiece has been displaced from the perpendicular to the source beam;

FIG. 5 is a schematic view of an alternative beam translating system where the movement of the mirrors is not perpendicular to the source beam.

DETAILED DESCRIPTION OF THE INVENTION

Figure 1:
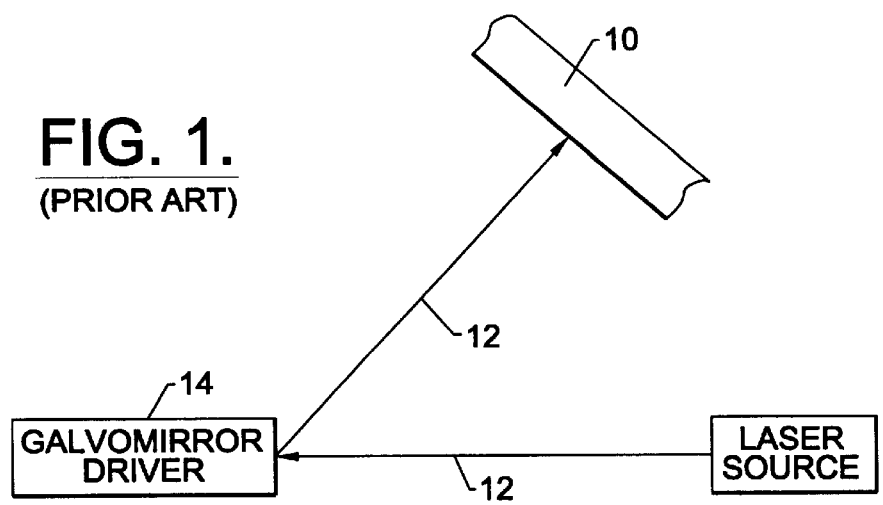
FIG. 1 is a schematic view of a prior art beam translation system in which a galvo-mirror driver is used to steer the laser beam.
Figure 2:
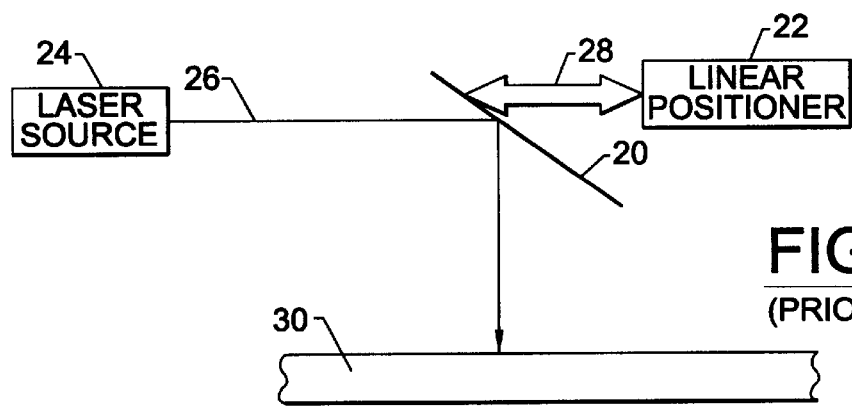
FIG. 2 is a schematic view of a prior art beam translation system using a linear positioner in combination with a mirror to laterally displace a laser beam.
Figure 3:
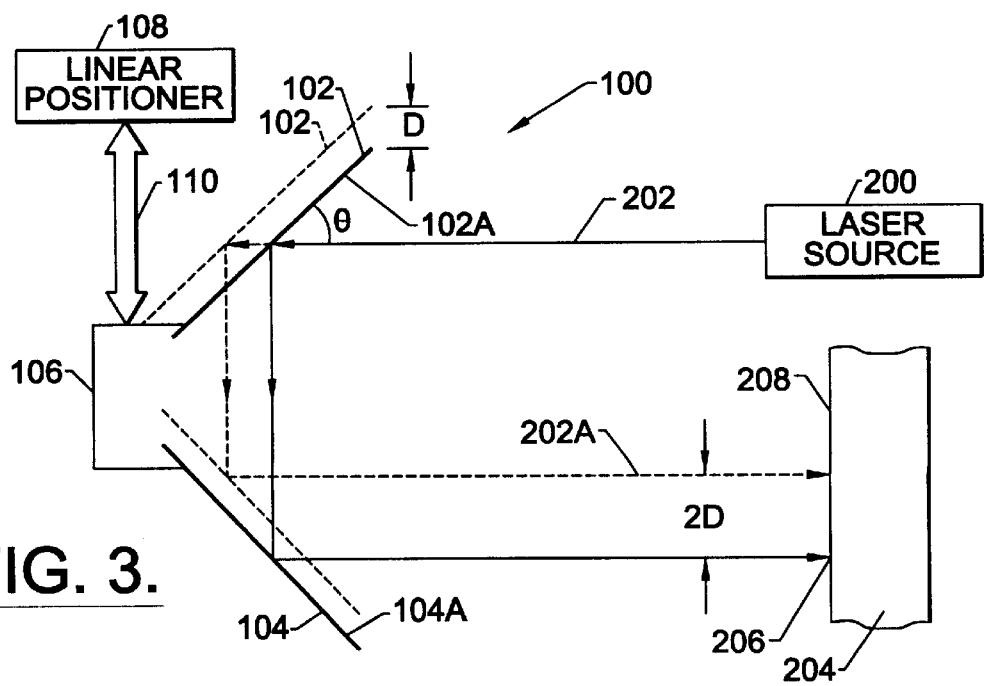
FIG. 3 is a schematic view of the constant path-length beam translating system for translating a laser beam in one dimension (e.g., the x-direction) according to the present invention.

Referring again to the drawings, and more particularly to FIG. 3, an embodiment of the constant path-length beam translating system according to the present invention is shown and referenced generally by numeral 100. Beam translating system 100 is configured to translate a laser beam 202 in one dimension, i.e., up and down in the plane of the paper in the illustrated example. Laser beam 202 originates from a laser source 200 which is held in a fixed position. Translation of laser beam 202 will be described relative to a target plane, e.g., workpiece 204.

By way of example, beam translating system 100 has mirrors 102 and 104 disposed at an angle of 90° to one another with their reflective surfaces 102A and 104A facing one another. Mirrors 102 and 104 are held fixed in such disposition by any suitable fixture 106. Coupled to mirrors 102 and 104 (e.g., via fixture 106) is a linear positioner 108 capable of linear movement in the directions indicated by two-headed arrow 110. In general, movement direction 110 is perpendicular to laser beam 202 in the plane defined by the laser beam as it reflects off mirrors 102 and 104. Therefore, in the illustrated example, movement direction 110 is perpendicular to laser beam 202 and in the plane of the paper. Beam translating system 100 is placed in the path of laser beam 202 such that beam 202 impinges on reflective surface 102A at an acute angle θ (e.g. 45° in the illustrated example).

In operation, beam 202 is reflected to reflective surface 104A and reflected away therefrom towards workpiece 204 along the solid-line beam path 202 that impinges on workpiece 204 at a position referenced by numeral 206. The portion of beam path 202 from laser source 200 to mirror 102 is parallel to the portion of beam path 202 from mirror 104 to workpiece 204. In the illustrated embodiment, the surface of workpiece 204 is perpendicular to beam path 202. When it becomes necessary to displace the position of the laser beam at workpiece 204, linear positioner 108 moves mirrors 102 and 104 simultaneously (via movement of fixture 106). For example, such movement in FIG. 3 is upwards and perpendicular to beam path 202 (as it originates as a source beam from laser source 200) in the plane of the paper so that mirrors 102 and 104 assume the dashed-line positions. Laser beam 202 from source 200 now impinges on mirrors 102 and 104 as referenced by the dashed-line path 202A of laser beam 202. After reflecting off mirror 104, beam 202A still impinges on workpiece 204 but is laterally displaced to position 208.

The amount of displacement between positions 206 and 208 is greater than the amount of displacement of mirrors 102 and 104. For example, when mirrors 102 and 104 are disposed at an angle of 90° to one another as shown, a displacement D of mirrors 102 and 104 (perpendicular to laser beam 202 and in the plane of the paper) results in a displacement of 2D between positions 206 and 208 (again, perpendicular to laser beam 202 and in the plane of the paper). In this way, beam translating system 100 can respond more quickly to displacement requirements since a lesser amount of movement of linear positioner 108 is required to generate a particular lateral displacement at the surface of workpiece 204. More importantly, the path length of the laser beam from laser source 200 to each of positions 206 and 208 is identical. This means that the laser beam can be optimized for one path length while assuring the desired amount of machining at each position on workpiece 204. The path length remains constant prior to, during, and after translation of beam 202.

The displacement relationship D-to-2D is not dependent on the angle θ. The displacement at the surface of workpiece 204 will be 2D as long as the angle between mirrors 102 and 104 is 90° and D is measured parallel to the plane of the surface of workpiece 204. However, the mirrors could be moved at an angle relative to the surface of workpiece 204 without the D-to-2D relationship being affected although the constant path-length feature of the present invention would be compromised. In addition, the angle θ is not required to be 45°. Rather, the controlling angle is the angle between mirrors 102 and 104. In the illustrated example, the mirrors must be disposed at 90° for the case where the surface of workpiece 204 is perpendicular to beam path 202. However, as shown in FIG. 4, if the surface of workpiece 204 were at an angle β displaced from the perpendicular to beam path 202, the constant path-length feature of the present invention is maintained by adjusting the angle between mirrors 102 and 104 to (90+β/2)° wherein β defines an angle of displacement of the outgoing beam from a perpendicular to the receiving surface and β has a value greater than zero and less than ninety.

As mentioned above, if the surface of workpiece 204 is perpendicular to the impinging beam, the angle between the mirrors must be 90° and mirror movement must be parallel to the surface of workpiece 204 in order to maintain the constant path-length feature. However, as shown in FIG. 5, if the movement of the mirrors (represented by two-headed arrow 111) is at an angle ω displaced from the perpendicular to beam path 202 (originating from laser source 200), the path length of the beam (from laser source 200 to workpiece 204) will change in accordance with the relationship $$2 \times \tan(\omega) \times D$$

where D is measured is measured perpendicular to beam path 202 originating from laser source 200. For small values of ω, the change in path length is negligible and is easily tolerated by the depth of field of most systems.

Figure 6:
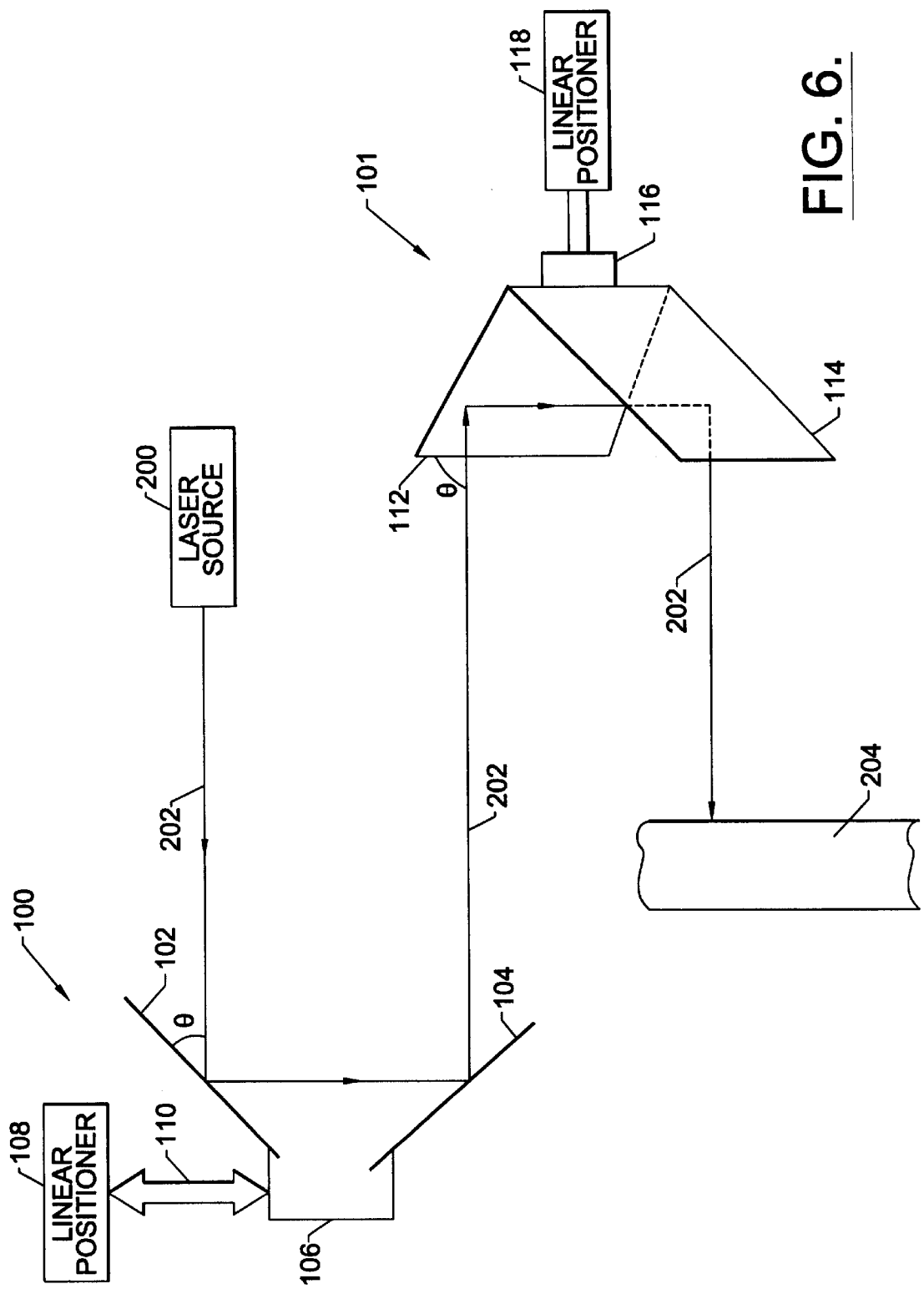
FIG. 6 is a schematic view of the constant path-length beam translating system of the present invention configured for translating a laser beam in two dimensions (e.g., the x and y-directions).

The present invention can also be adapted to provide for beam translation in each of two dimensions at the surface of a workpiece. Such an embodiment is shown in FIG. 6 where beam translating system 100 is provided as in FIG. 3 to displace beam 202 vertically, i.e., in the plane of the paper. A second beam translating system 101 (identical to system 100) is then provided in the path of the beam 202 reflecting off mirror 104. More specifically, mirrors 112 and 114 are disposed at 90° to one another and are fixed in such relation by means of fixture 116. A linear positioner 118 is coupled to fixture 116 to move mirrors 112 and 114 simultaneously in a direction perpendicular to the movement provided by linear positioner 108. That is, in the illustrated example, linear positioner 118 moves mirrors 112 and 114 perpendicular to the plane of the paper. Linear positioner 118 can be moved independently of linear positioner 108.

Mirrors 112 and 114 are placed in the path of beam 202 reflecting off mirror 104 such that beam 202 impinges on mirror 112 at an acute angle φ (e.g., 45° in the illustrated example), is reflected to mirror 114 and then therefrom towards workpiece 204. Translation of beam 202 in the vertical dimension (i.e., the plane of the paper) is brought about by system 100 while translation in the horizontal dimension (i.e., the plane perpendicular to the plane of the paper) is brought about by system 101. Once again, the path length from laser source 200 to workpiece 204 is constant prior to, during and after translation.

The advantages of the present invention are numerous. A beam of radiation can be translated in one or two dimensions while maintaining a constant path length between the laser source and workpiece. Thus, the beam can be optimized one time for use over a given surface area of a workpiece. Furthermore, a greater than 1:1 correspondence is achieved between beam displacement and mirror displacement. As a result, the beam translating system will have a faster response time than prior art linear beam-displacement systems.

Although the invention has been described relative to a specific embodiment thereof, there are numerous variations and modifications that will be readily apparent to those skilled in the art in light of the above teachings. For example, each dimension of displacement could use cascading ones of the beam translating system as described above. This would be useful when large amounts of beam displacement in a particular dimension were required. It is therefore to be understood that, within the scope of the appended claims, the invention may be practiced other than as specifically described.

What is claimed as new and desired to be secured by Letters Patent of the United States is:

1. A constant path-length beam translating apparatus, comprising:

a pair of mirrors having reflective surfaces disposed at an angle to one another, said pair of mirrors being in a path of an incoming beam of radiation from said source such that said incoming beam of radiation I) impinges on said reflective surface of a first of said pair of mirrors, ii) is reflected to said reflective surface of a second of said pair of mirrors, and iii) is reflected from said second of said pair of mirrors as an outgoing beam of radiation;

a receiving surface for receiving said outgoing beam, said receiving surface disposed at a 90°+β° angle to said outgoing beam, wherein β° defines an angle of displacement of said outgoing beam from a perpendicular to said receiving surface; and a positioner coupled to said pair of mirrors for simultaneously moving said pair of mirrors in a direction that is angularly disposed to said incoming beam and in a plane defined by said incoming beam and said outgoing beam, and wherein said angle of said reflective surfaces of said pair of mirrors comprises an angle of (90+β/2)° for maintaining a constant path length between a source of said radiation and said receiving surface for varying displacement angles β°, wherein β has a value greater than zero and less than ninety.

2. A beam translating apparatus as in claim 1 further comprising:

another pair of mirrors having reflective surfaces disposed at 90° to one another, said another pair of mirrors being fixed in relation to one another and disposed in a path of said outgoing beam such that said outgoing beam i) impinges on said reflective surface of a first of said another pair of mirrors, ii) is reflected to said reflective surface of a second of said another pair of mirrors, and iii) is reflected from said second of said another pair of mirrors as a further-translated outgoing beam of radiation parallel to said outgoing beam; and another positioner coupled to said another pair of mirrors for independently and simultaneously moving said another pair of mirrors in a second direction that is parallel to said plane perpendicular to said outgoing beam and in the plane defined by said outgoing beam and said further-translated outgoing beam, wherein displacement of said another pair of mirrors in said second direction causes a displacement of said further-translated outgoing beam in said second direction, and wherein a path length defined by said outgoing beam and said further-translated outgoing beam stays the same prior to, during and after said moving of said another pair of mirrors.

3. A beam translating apparatus as in claim 2 wherein said direction is perpendicular to said second direction.

4. An apparatus for delivering a beam to a workpiece, comprising:

a source fixed in its position and producing a beam of radiation along a path;

a pair of mirrors having reflective surfaces disposed at 90°+β/2° to one another, said pair of mirrors being adjustable as defined by β in relation to one another and disposed in said path of said beam such that said beam I) impinges on said reflective surface of a first of said pair of mirrors at an acute angle therewith, ii) is reflected to said reflective surface of a second of said pair of mirrors, and iii) is reflected from said second of said pair of mirrors as a reflected beam, wherein said reflected beam is directed to the workpiece; and a positioner coupled to said pair of mirrors for simultaneously moving said pair of mirrors in a direction that is perpendicular to said beam and in the plane defined by said beam and said reflected beam, wherein displacement of said pair of mirrors in said direction causes a displacement of said reflected beam in said direction, and wherein a path length defined by said beam and said reflected beam between said source and a surface of the workpiece stays the same prior to, during and after said moving of said pair of mirrors wherein said surface of the workpiece is at an angle of 90°+β° to said reflected beam, and wherein β has a value greater than zero and less than ninety.

5. An apparatus as in claim 4 wherein said acute angle formed between said beam and said first reflective surface of said first of said pair of mirrors is approximately 45°.

6. An apparatus as in claim 4 further comprising:

another pair of mirrors having reflective surfaces disposed at 90° to one another, said another pair of mirrors being fixed in relation to one another and disposed between said source and the workpiece to intercept said reflected beam such that said reflected beam i) impinges on said reflective surface of a first of said another pair of mirrors at an acute angle therewith, ii) is reflected to said reflective surface of a second of said another pair of mirrors, and iii) is reflected from said second of said another pair of mirrors as a further-translated reflected beam parallel to said reflected beam, wherein said further-translated reflected beam is directed to the workpiece; and another positioner coupled to said another pair of mirrors for independently and simultaneously moving said another pair of mirrors in a second direction that is perpendicular to said reflected beam and in a plane defined by said reflected beam and said further-translated reflected beam, wherein displacement of said another pair of mirrors in said second direction causes a displacement of said further-translated reflected beam in said second direction, and wherein a path length defined by said beam and said further-translated reflected beam between said source and said surface of the workpiece stays the same prior to, during and after said moving of said pair of mirrors and said another pair of mirrors provided said surface of the workpiece is perpendicular to said further-translated reflected beam.

7. An apparatus as in claim 6 wherein said acute angle formed between said reflected beam and said first reflective surface of said first of said another pair of mirrors is approximately 45°.

8. A method of translating a beam of radiation comprising the steps of:

providing a pair of mirrors having reflective surfaces disposed at an angle to one another and being movable in relation to one another;

transmitting an incoming beam of radiation along a path that causes said incoming beam of radiation I) to impinge on said reflective surface of a first of said pair of mirrors, ii) to be reflected to said reflective surface of a second of said pair of mirrors, and iii) to be reflected from said second of said pair of mirrors as an outgoing beam of radiation;

positioning a receiving surface at a 90°+β° angle to said outgoing beam for receiving said outgoing beam thereon, wherein β defines an angle of displacement of said outgoing beam from a perpendicular to said receiving surface, and wherein β has a value greater than zero and less than ninety;

directing said outgoing beam onto said receiving surface;

changing said angle between said reflective surfaces to an angle of (90+β/2)° for maintaining a constant path length between a source of said radiation and said receiving surface for varying displacement angles β°; and moving said pair of mirrors simultaneously in a direction that is angularly disposed to said incoming beam and in a plane defined by said incoming beam and said outgoing beam.

9. A method according to claim 8 further comprising the step of causing said incoming beam to impinge on said reflective surface of said first of said pair of mirrors at an angle of approximately 45° therewith.

10. A method according to claim 8 further comprising the steps of:

providing another pair of mirrors having reflective surfaces disposed at 90° to one another, said another pair of mirrors being fixed in relation to one another and disposed in a path of said outgoing beam such that said outgoing beam i) impinges on said reflective surface of a first of said another pair of mirrors, ii) is reflected to said reflective surface of a second of said another pair of mirrors, and iii) is reflected from said second of said another pair of mirrors as a further-translated outgoing beam of radiation parallel to said outgoing beam; and moving said another pair of mirrors independently and simultaneously in a second direction that is parallel to said plane perpendicular to said outgoing beam and in the plane defined by said outgoing beam and said further-translated outgoing beam, wherein displacement of said another pair of mirrors in said second direction causes a displacement of said further-translated outgoing beam in said second direction, and wherein a path length defined by said outgoing beam and said further-translated outgoing beam stays the same prior to, during and after said moving of said another pair of mirrors.

11. A method according to claim 10 further comprising the step of positioning said another pair of mirrors such that said outgoing beam impinges on said reflective surface of said another pair of mirrors at an angle of approximately 45° therewith.

12. A method according to claim 10 wherein said direction is perpendicular to said second direction.

13. An apparatus for delivering a beam to a workpiece surface, comprising:

a source for producing a source beam of radiation along a path;

a pair of mirrors having reflective surfaces disposed at a mirror angle having a value of 90°+β/2° to one another, said mirror angle varying with varying values of β, said pair of mirrors disposed in said path of said source beam for providing a reflected beam, wherein said angle β° defines an angle of displacement of said reflected beam from a perpendicular to said receiving surface; and a positioner coupled to said pair of mirrors for simultaneously moving said pair of mirrors in a direction that is perpendicular to and in a plane of said source beam and said reflected beam, wherein displacement of said pair of mirrors in said direction causes a displacement of said reflected beam across said receiving surface, wherein a path length between said source and said receiving surface remains constant for varying positions on said receiving surface with said receiving surface at angle 90°+β to said reflected beam and said mirror angle at 90°+β/2°, and wherein β has a value greater than zero and less than ninety.

14. A method of providing a constant path length between a radiation source and a receiving surface, which surface receives a light beam at non-orthogonal angles to the surface, the method comprising the steps of:

providing a radiation source having a source beam emanating therefrom;

placing a pair of mirrors in a path of said source beam, wherein said pair of mirrors has reflective surfaces disposed at a mirror angle to one another;

reflecting said source beam into a reflected beam;

positioning said receiving surface at a 90°+β° angle to said reflected beam for receiving said reflected beam thereon, wherein β° defines an angle of displacement of said reflected beam from a perpendicular to said receiving surface;

directing said reflected beam onto said receiving surface;

changing said mirror angle to 90°+β/2° for maintaining a constant path length between said radiation source and said receiving surface for varying displacement angles β°; and scanning said reflected beam across said receiving surface by simultaneously moving said pair of mirrors in a direction that is perpendicular to and in a plane of said source beam and said reflected beam while maintaining said mirror angle at 90°+β/2° for reflective beam angle 90°+β° incident on said receiving surface, wherein β has a value greater than zero and less than ninety.

* * * * *